United States Patent [19]

Blesser

[11] Patent Number: 4,577,057
[45] Date of Patent: Mar. 18, 1986

[54] DIGITIZING TABLET SYSTEM HAVING STYLUS TILT CORRECTION

[75] Inventor: Barry Blesser, Raymond, N.H.
[73] Assignee: Pencept, Inc., Waltham, Mass.
[21] Appl. No.: 585,711
[22] Filed: Mar. 2, 1984
[51] Int. Cl.[4] .............................................. G08C 21/00
[52] U.S. Cl. ......................................... 178/18; 178/19
[58] Field of Search ..................................... 178/18, 19

[56] References Cited

U.S. PATENT DOCUMENTS

| | | | |
|---|---|---|---|
| 3,700,809 | 10/1972 | Nadon | 178/87 |
| 3,705,956 | 1/1972 | Dertouzos | 178/18 |
| 3,735,044 | 5/1973 | Centner et al. | 178/19 |
| 3,873,770 | 3/1975 | Ioannou | 178/18 |
| 3,999,012 | 12/1976 | Dym | 178/18 |
| 4,088,842 | 5/1978 | Ikedo | 178/19 |
| 4,240,065 | 12/1980 | Howbrook | 178/18 |
| 4,246,439 | 1/1981 | Romein | 178/18 |
| 4,289,927 | 9/1981 | Rodgers | 178/19 |
| 4,368,351 | 1/1983 | Zimmer | 178/19 |
| 4,375,081 | 2/1983 | Blesser | 364/724 |

Primary Examiner—Stafford D. Schreyer
Attorney, Agent, or Firm—Robert M. Asher

[57] ABSTRACT

A digitizing tablet system of the type including a tablet, a stylus and associated electronics which is constructed to correct for tilt errors when the stylus axis is tilted relative to the tablet is disclosed. The tablet includes a housing having a rectangular coordinate grid of electrical conductors. The stylus includes an elongated tubular member having a tip at one end, a first coil which is located at a first axial distance from the tip and a second coil which is located at a second axial distance from the tip, the second distance being different from the first distance. A voltage signal is applied to each coil sequentially. The signal applied to each coil induces a voltage in each conductor in the grid. The induced voltages are processed to produce a first and a second data signal, the first data signal corresponding to the position of the first coil relative to the grid and the second data signal corresponding to the position of the second coil relative to the grid, with the difference in the two data signals, if any, being caused by tilt of the stylus. The two data signals are then processed to produce a third data signal corresponding to the position of the tip of the stylus relative to the grid of conductive elements.

14 Claims, 7 Drawing Figures

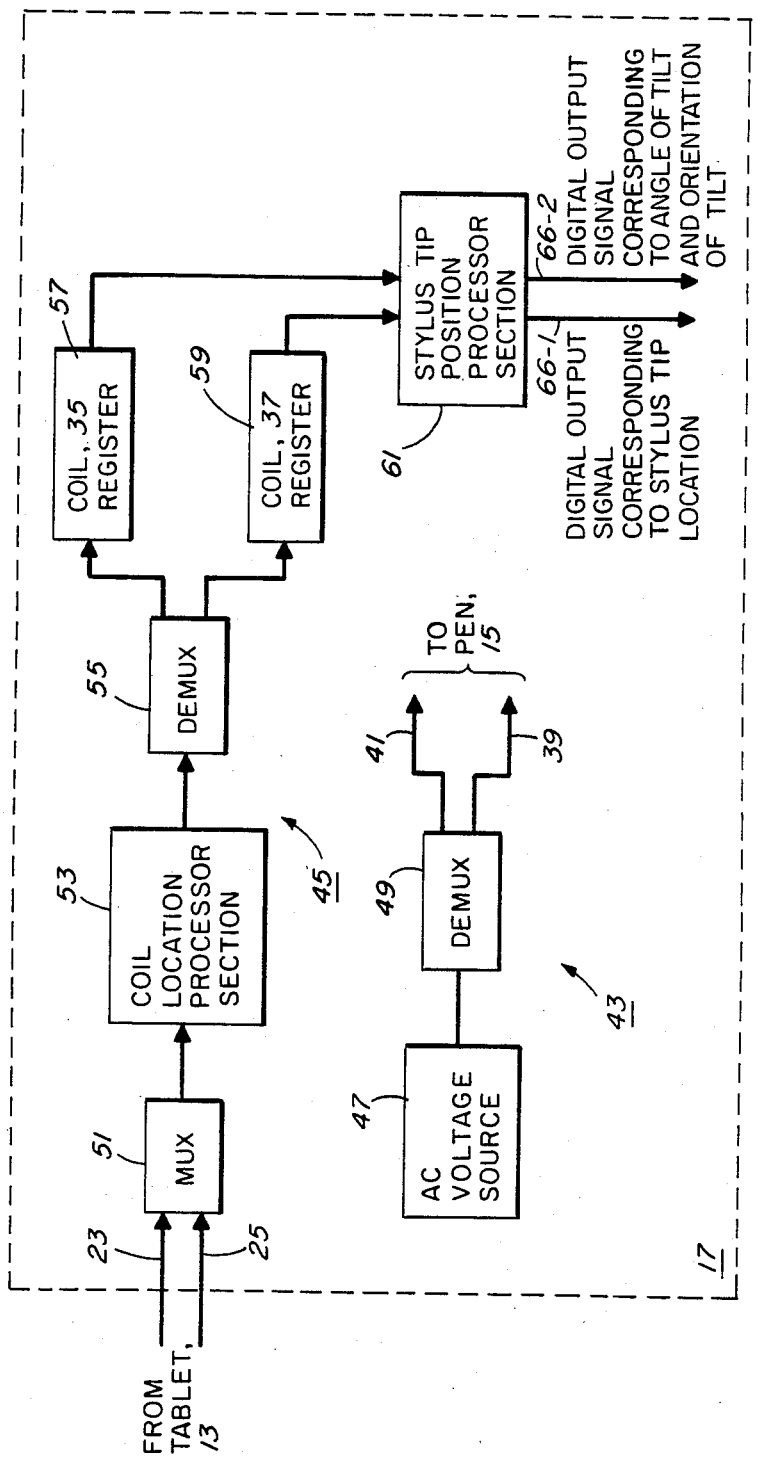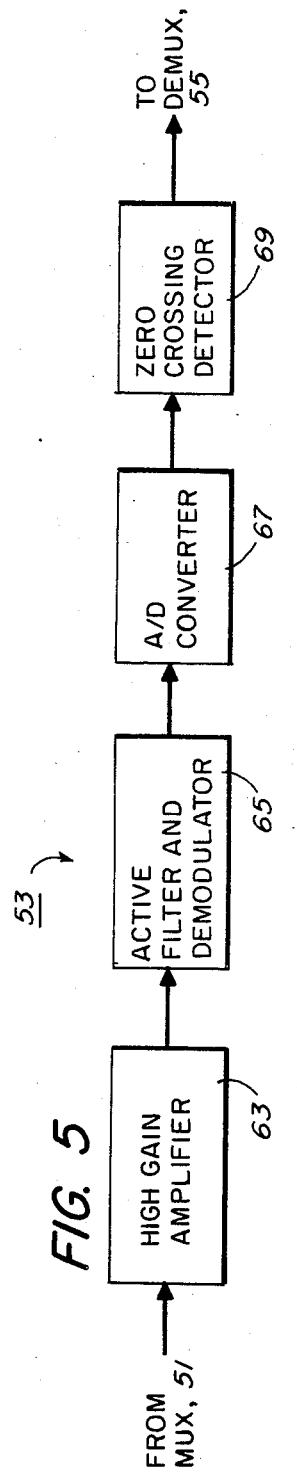

DIGITIZING TABLET SYSTEM HAVING STYLUS TILT CORRECTION

BACKGROUND OF THE INVENTION

The present invention relates generally to digitizing tablet systems and more particularly to a digitizing tablet system which is constructed so as to automatically correct for stylus tilt errors.

Digitizing tablet systems are well known in the art and are used in a variety of applications. These systems generally include a tablet, a stylus and some instrumentality for producing some form of interaction between the stylus and the tablet from which is derived digital data signals representing the position of the stylus on the tablet.

In a number of these systems the tablet contains a grid of conductive elements and the stylus contains an electric coil. Inductive type of interaction between the coil in the stylus and the grid in the tablet is achieved by energizing either the coil or the grid with an AC voltage signal and then measuring the voltage signal induced in the other element. In other systems, capacitive type coupling with the grid in the tablet is achieved by using a flat conductive disk in the stylus in place of the coil. In addition to the conductive element, the stylus usually contains either a ball point pen or a pencil with the tip of the pen or pencil terminating at the tip of the stylus so that the stylus can write or draw on a surface as its position is being monitored. Since the pen or pencil point is at the tip of the stylus, the conductive element is, by necessity; and because of its physical size located within the stylus barrel at some finite distance, such as one half of an inch, from the tip.

In some digitizing tablet sysems the stylus is held in the hand of the user while in other digitizing tablet systems the stylus is mechanically mounted at right angles to the working surface of the tablet.

When the stylus is held in the hand of the user it is generally not held at right angles to the tablet but rather at some acute angle thereto. Furthermore, in the course of writing on the tablet the angle will very often change. In systems in which the element in the stylus which interacts with the element in the tablet is located at the exact tip of the stylus and directly contacts an element in the tablet, the angle in which the stylus is held relative to the tablet will generally not be a factor. However, if the element is not at the tip of the stylus an error, called stylus tilt error, will occur if the stylus is not exactly perpendicular to the working surface of the tablet. This will happen because the position signal produced by the location of the conductive element in the stylus relative to the grid of conductive elements in the tablet will not correspond the position where the tip of the stylus is actually in contact with the tablet. Furthermore, if the angle of tilt changes as a line or character is drawn, which is very often the case, the size of the tilt error from point to point over the line or character will change.

For many applications stylus tilt error is not acceptable.

In U.S. Pat. No. 3,873,770 to J. Ioannou there is disclosed a digitizing tablet system in which tilt error is described as being compensated for by a complex technique which involves measuring changes in the positive and negative peaks of the envelope waveform produced when the array of conductors are sequentially energized.

In U.S. Pat. No. 3,700,809 to D. J. Nadon there is disclosed an inductively coupled grid cursor in which the tip of the cursor is configured in a way that is specially designed to minimize stylus tilt errors.

In U.S. Pat. No. 4,289,927 to J. L. Rogers there is disclosed graphic communciation apparatus for electronically writing information and transmitting which includes a pen having a pair of windings disposed in a predetermined angular relation with respect to each other, and a writing surface having a plurality of windings arranged substantially parallel to each other for sensing the presence of the pen from the magnetic fields of the pen coils to provide differential outputs over the writing surface with respect ot he windings of the pen apparatus, and the differential outputs being located with respect to the writing surface in an X-Y orientation.

Other known references of interest include U.S. Pat. No. 3,705,956 to M. L. Dertouzos; U.S. Pat. No. 3,735,044 to R. N. Centner et al; U.S. Pat. No. 4,368,351 to S. E. Zimmer; U.S. Pat. No. 4,375,081 to B. Blesser and U.S. Pat. No. 3,999,012 to H. Dym.

It is an object of this invention to provide a new and improved digitizing tablet system.

It is another object of this invention to provide a digitizing tablet system which automatically corrects for stylus tilt errors.

It is still another object of this invention to provide a new and improved stylus for use with a digitizing tablet system.

It is yet still another object of this invention to provide a new and improved technique for determining the position of a stylus on a work surface.

SUMMARY OF THE INVENTION

A digitizing tablet system constructed according to the teachings of the present invention includes a tablet having a grid of position determining elements, a stylus and associated circuitry. The stylus includes a first position determining element which is located at a first known and fixed axial distance from the tip of the stylus and a second position determining element which is located at a second known and fixed axial distance from the tip of the stylus, the second distance being different from the first distance. The interaction of the two elements in the stylus with the grid of elements in the tablet, when either the grid of elements or the two elements are energized, produces two sets of signals, one set from the first element in the stylus and the set from the second element in the stylus. The two sets of signals are processed separately to produce a first data signal corresponding to the position of the first element in the stylus relative to the grid of elements and a second data signal corresponding to the position of the second element in the stylus relative to the grid of elements, with the difference in the two signals, if any, being caused by tilt of the stylus relative to the tablet. These two data signals are then processed to produce a third data signal corresponding to the position of the tip of the stylus relative to the grid of conductive elements.

Various features and advantages will appear from the description to follow. In the description, reference is made to the accompanying drawing which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts:

FIG. 4 is a block diagram of the electronics portion of the invention;

FIG. 5 is a block diagram of the coil location processing section shown in FIG. 4;

DETAILED DESCRIPTION OF PREFERRED EMBODIMENT

The present invention is directed to a digitizing tablet system of the type including a tablet and a stylus which is constructed so as to automatically correct for stylus tilt errors. The present invention accomplishes this by providing a digitizing tablet system in which the stylus contains two elements each of which interacts with the tablet to produce a separate positional data signal, each signal corresponding to the position of one of the elements relative to the tablet. Each element is disposed within the stylus at a different axial distance from the tip of the stylus so that the signals will be different when the stylus is tilted. The two signals so obtained are then processed to produce a signal corresponding to the position of the tip of the stylus relative to the tablet.

It is to be understood that the invention is applicable to any type of digitizing table system in which positional data is obtained by the interaction of some type of element in a stylus, located at some finite distance from the tip of the stylus, with an array or grid of elements in the tablet. The interaction may be realized, for example, by capacative, inductive or acoustic coupling. The coupling signal may either be emitted from the stylus or from the tablet and the elements in the tablet may either be arranged in a rectangular (Cartesian) or polar coordinate configuration. The stylus may be a pen type or pencil type or the like or even a stylus that does not have a writing (i.e. recording) element.

For illustrative purposes, however, the invention will hereinafter be described with reference to a digitizing tablet system of the type in which the tablet contains a rectangular coordinate grid of conductors, the interaction of the tablet with the stylus is achieved through inductive coupling between the stylus and the tablet, the energizing signals are applied to the stylus causing signals to be induced in the grid and the stylus is in the form of a pen.

Figure 1:
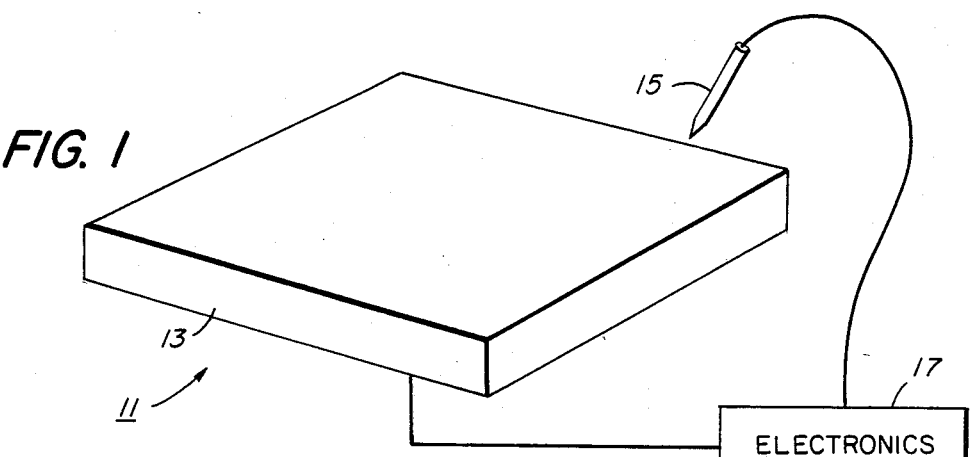
FIG. 1 is a simplified view of a digitizing tablet system constructed according to the teachings of the present invention.
Figure 2:
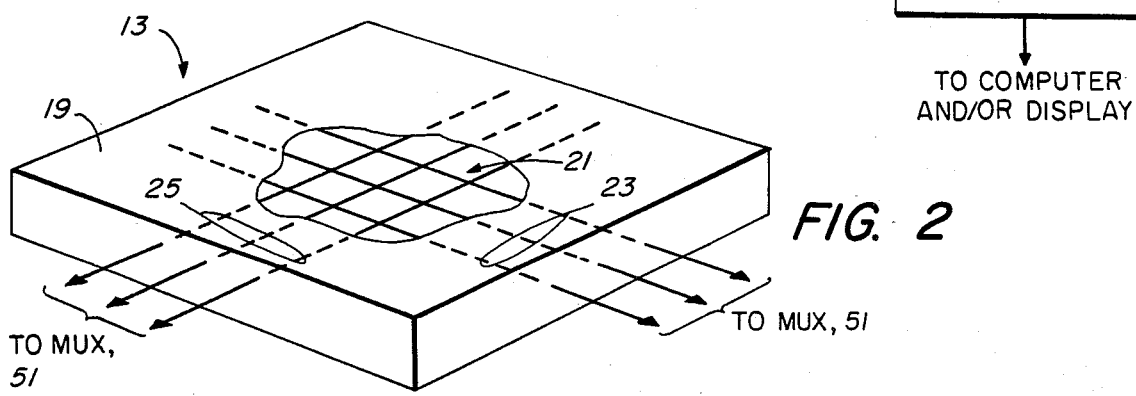
FIG. 2 is a more detailed view partly broken away of the tablet shown in FIG. 1.

Referring now to the drawings, there is illustrated in FIG. 1 a digitizing tablet system constructed according to the teachings of the present invention and identified generally by reference numeral 11.

Digitizing tablet system 11 includes a tablet 13, a pen type stylus 15 and associated electronics 17. Stylus 15 is coupled to electronics 17 through four wires which are illustrated in FIG. 1 as a single wire. Tablet 13 is coupled to electronics 17 through a plurality of wires which are also shown in FIG. 1 as a single wire.

Figure 3:
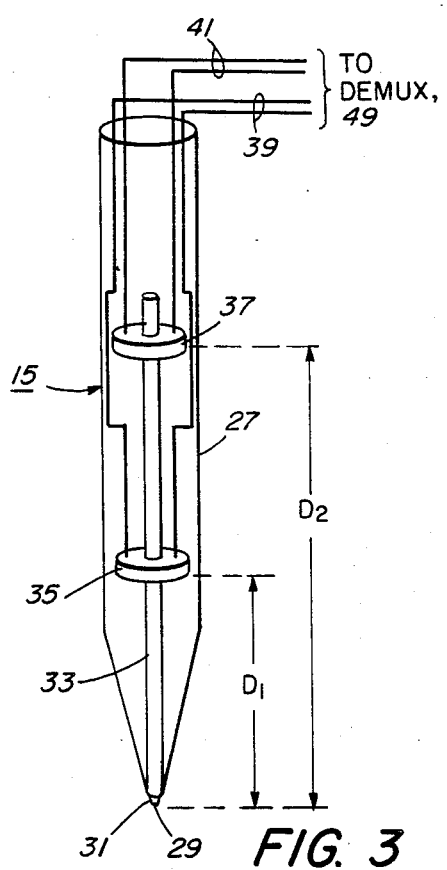
FIG. 3 is an enlarged more detailed view of the pen shown in FIG. 1.

Tablet 13 is constructed, as shown in FIG. 3, to include a generally rectangularly shaped housing having a top flat surface 19 on which may be placed a worksheet (not shown) which may be positioned and maintained in place by any suitable means (also not shown). Tablet 13 incudes a grid 21 of conductive elements. Grid 21 includes a first plurality of spaced parallel conductors 23 lying in a plane slightly below and parallel to top surface 19 and defining one axis, or the "X" axis, of measurement and second plurality of spaced parallel conductors 25 lying in a plane slightly spaced from and parallel to top surface 19, spaced from first conductors 23 and at right angles thereto and defining a second, or "Y" axis, of measurement. For simplicity, only a few of the conductors in each set are shown.

Stylus 15 is a hand held type or instrument and includes an elongated cylindrical body or housing 27 which terminates at a tip 29 at one end which is adapted to be placed on the work sheet positioned on tablet 13. Tip 29 contains a ballpoint 31 which receives ink from a cartridge 33. A first coil 35 is disposed within the body 27 of stylus 15 at first axial distance $D_1$ from tip 29 and a second coil 37 is disposed within the body 27 of stylus 15 at a second axial distance $D_2$ from tip 29. As can be seen, distance $D_1$ is a different, i.e. larger, distance than distance $D_2$. Coils 35 and 37 are preferably identical in size and shape. The turns of each coil 35 and 37 are in a plane that is orthogonal to the longitudinal axis of stylus 15. Coil 35 is connected to electronics 17 by a pair of leads 39 and coil 37 is connected to electronics 17 by a pair of leads 41.

For simplicity, portions of tablet 13 and stylus 15 not pertinent to the invention have been omitted.

Electronics 17 includes a signal emitting section 43 and a signal receiving and processing section 45. Signal emitting section 43 includes an AC voltage source 47 and a demultiplexor 49. Signal receiving and processing section 45 includes a multiplexor 51, a coil location processor section 53, a demultiplexor 55, a pair of registers 57 and 59 and a stylus tip position processor section 61. Coil location processor section 53 may comprise, as shown in FIG. 5, a high gain amplifier 63, an active filter and demodulator 65, an analog to digital converter 67 and a zero crossing detector 69.

In the operation of digitizing tablet system 11, a voltage signal from AC voltage source 47 is applied sequentially to coils 35 and 37 in pen 15 through demultiplexor 49. As each coil is energized sequentially, separate flux patterns will be produced linking the particular coil that is energized to the conductors in grid 21. This will induce voltages in the conductors in grid 31, the amplitude and polarity of the voltage signals being a function of the distance from the coil that is energized to create the flux field to the particular conductor in the grid 21 and the direction from that coil to the conductor. Thus, if the coil is located to the right of a conductor a voltage signal of one polarity will be produced and if the coil is to the left of the conductor, a voltage signal of the other polarity will be produced.

The induced voltage signal from each conductor in array 21 is fed sequentially into coil location processor section 53 by means of multiplexor 51. In coil location processor section 53, the signals from conductors 23 and 25 are individually processed to provide a first digital output signal corresponding to the X and Y coordinates of the position of coil 35 relative to array 21 and a second digital output signal corresponding to the X and Y coordinates of the position of coil 37 relative to array 21.

The digital position output signal produced as a result of the energization of coil 35 is fed through demultiplexor 55 into register 57 and the digital output signal produced as a result of the energization of coil 37 is fed through demultiplexor 55 into register 59.

The signals in registers 57 and 59 are fed into stylus tip position processor section 61 where they are processed to produce a digital output signal over line 61-1 corresponding to the X and Y coordinates of the location of tip 29 of stylus 15 relative to grid 21. Stylus tip position processor section 61 also produces a digital output signal over line 61-2 corresponding to the angle of tilt of stylus 15 and the orientation of the tilt. The two output signals are fed to a computer and/or a display (not shown).

Stylus tip position processor section 61 may comprise a microprocessor such as a model number 6801.

Figure 6:
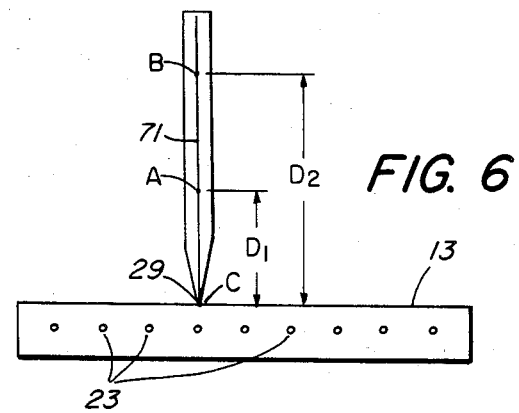
FIG. 6 is a diagram illustrating the pen in an untilted position on the tablet.
Figure 7:
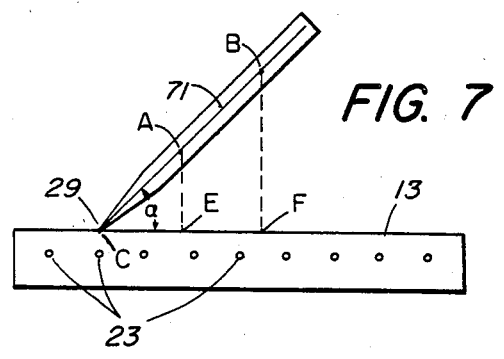
FIG. 7 is a diagram illustrating the pen in a tilted position on the tablet.

The processing performed in stylus tip position processor section 61 may be best understood in connection with FIGS. 6 and 7.

In FIGS. 6 and 7, line 71 represents the longitudinal axis of pen 15, point A represents the location of coil 35 on axis 71 and point B represents the location of coil 37 on axis 71. In FIG. 6 the pen axis 71 is perpendicular to tablet 13 (i.e. in an untilted position) while in FIG. 7 the pen axis 71 on pen 15 is tilted in the "X" direction at an angle $\alpha$ relative to tablet 13.

When pen 15 is untilted, as in FIG. 6, the waveform envelope of signals induced in conductors 23 due to the energization of coil 35 will be identical in shape to the waveform envelope of signals induced in conductors 23 due to the energization of coil 37 since each coil is at the same proportionate distance from each one of the conductors. The waveform envelope from each coil, when processed, will produce a position signal corresponding to point C. There will be no error (or difference) signal and the output signal over line 61-1 from stylus tip processor section 61 will be the same as the position signals derived from the individual coils.

On the other hand, when pen 15 is tilted at an angle $\alpha$, as shown in FIG. 7, the waveform envelopes will not be the same from each coil. Instead, coil 35 (at a distance A on pen 15) will produce a position data signal corresponding point E on tablet 13 while coil 37 (at location B on pen 15) will produce a position data signal corresponding to point F on tablet 13. The signals will be different because the coils are at a different axial distances along pen 15 and as a result will be over different locations on tablet 13 when pen 15 is tilted.

However, by using geometrical relationships and more specifically, proportional triangles, the error signal from which may be calculated the position signal of tip 29 on tablet 13 as well as the tilt angle and orientation of the tilt can be readily ascertained.

As can be seen, by using triangles ACE and BCF and the fact that the ratio of corresponding sides of similar triangles are equal, the ratio of the distance from A to C over the distance from B to C is equal to the ratio of the distance from C to E over the distance from C to F; that is, $$\frac{AC}{BC} = \frac{CE}{CF}$$

Solving for CE $$CE = \frac{(AC)(EF)}{BC - AC}$$

where CE is the error or correction that must be applied to the reading from coil 35 (i.e. point E) to obtain the position of tip 29 (i.e. point C).

Since AC and AB are known, once the position data signals from coils 35 and 37 (i.e. points E and F have been obtained) the location of tip 29 and the tilt angle and orientation thereof, can be calculated. The processing may be by any suitable algorithm or by table look-ups or the like.

For example, if coil 35 is at a distance $D_1$ from tip 29 of 1 inch and coil 35 is at a distance $D_2$ from tip 29 of 3 inches, the position reading from coil 35 is 7 units and the position reading from coil 37 is 11 units, then the correction that must be applied to the reading of coil 35 to obtain the position reading of pen tip 29 is equal to $$\frac{(1)(11 - 7)}{3 - 1} = \frac{4}{2} = 2 \text{ units.}$$

Applying this correction, the location of pen tip 29 is 7 minus 2 or 5 units.

Once CE has been determined, the angle of tilt $\alpha$ can be calculated using the low of cosines. That is, the cosine of angle = (CE)/(AC). This may also be achieved using a table look up or the like.

Tilt error correction in the Y direction is obtained in the same manner.

Instead of processing the position signals from the two coils to determine an error or correction signal to apply to the signal from coil 35, the position signals may be processed to determine an error signal to be applied to the signal from coil 37 using the formula $$CF = \frac{(EF)(BC)}{BC - AC}$$

Instead of energizing coils 35 and 37 and measuring voltages induced in each element in grid 21 from each coil, the individual elements in grid 21 may be energized and the voltages measured that are induced in each coil. Also, instead of applying the same excitation signal to both coils 35 and 37 or to grid 21, two uniquely detectable excitation signals, such as signals of different frequencies, may be employed with each signal being used to interact with one of the coils. These embodiments will require some modification in electronics 17. Furthermore, techniques known in the art other than zero crossing detection may be employed to produce separation position signal for each one of the coils. Also, processor section 53 and processor section 61 may be a single unit.

The embodiment of the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A digitizing tablet system comprising:
   a. a housing having a two dimensional work surface for receiving a work sheet and a plurality of elements which define a rectangular coordinate grid,
   b. a stylus, positioned within said rectangular coordinate grid, having a tip adapted to contact said work sheet and a pair of elements for interacting with said plurality of elements in said housing for determining the position of said tip within said rectangular coordinate grid, said pair of elements in said stylus comprising a first element disposed within said stylus at a first distance from said tip and a second element disposed within said stylus at a second distance from said tip, said second distance being different from said first distance,
   c. means for energizing one of said grid of plurality of elements and said pair of elements in said stylus and producing thereby a first set of electrical output signals each having an amplitude and polarity related to the position of the first element in the pen within said rectangular coordinate grid and a second set of electrical output signals each having an amplitude and polarity related to the position of the second element in the stylus within said rectangular coordinate grid,
   d. electronic means for processing the respective amplitudes and polarities of said first set of electrical output signals and said second set of electrical output signals to produce third and fourth electrical signals corresponding to the positional data of the first and second elements in the pen, respectively, relative to the grid, and
   e. processing means for producing from said third and fourth electrical signals a fifth electrical signal corresponding to positional data of the tip of the stylus within said rectangular coordinate grid.

2. The digitizing tablet system of claim 1 further comprising means for sequentially feeding the signals of said first set of electrical signals and of said second set of electrical signals into said electronic means for processing the amplitudes and polarities.

3. The digitizing tablet system of claim 2 wherein said sequential feeding means comprises a multiplexor.

4. The digitizing tablet system of claim 2 wherein each signal of said first and second set of electrical signals is processed individually by said electronic means for processing the amplitudes and polarities.

5. The digitizing tablet system of claim 4 and wherein the pair of elements in the stylus are coils.

6. The digitizing tablet system of claim 5 and wherein the grid of elements in the housing are conductive elements.

7. The digitizing tablet system of claim 6 and wherein the conductive elements are arranged in two sets to define a two dimensional coordinate system.

8. The digitizing tablet system of claim 7 and wherein the means for energizing one of said grid of plurality of elements and said pair of elements comprises an AC voltage source.

9. The digitizing tablet system of claim 8 and wherein the AC voltage source is coupled to the pair of elements in the stylus.

10. The digitizing tablet system of claim 9 and wherein the electronics means includes coil location processing means, a pair of register means and stylus tip processor means.

11. The digitizing tablet system of claim 10 and wherein the stylus is a ball point type instrument.

12. The digitizing tablet system of claim 1 wherein said stylus is positioned at an angle of tilt relative to said work surface and said means for processing the amplitudes and polarities also produces a data signal corresponding to the angle of tilt as determined by a law of cosines calculation.

13. A digitizing tablet system comprising:
   a. a tablet having a rectangular coordinate grid of conductive elements,
   b. a stylus having an elongated tubular housing, a tip adapted to contact said tablet, a first coil disposed in said housing at a first axial distance from said tip and a second coil disposed in said housing at a second axial distance from said tip, said second axial distance being different from said first axial distance, said tip and said first and second coils each located at positions relative to said grid,
   c. means for applying an AC voltage signal to each one of said coils,
   d. means for sensing the amplitude and polarity of the voltages induced in said grid from the signal applied to each coil and generating therefrom a pair of data signals one representing the position of one coil relative to the grid and the other signal representing the position of the other coil relative to the grid,
   e. register means for temporarily storing said two data signals, and
   f. processing means for processing said two data signals in said register means and producing therefrom a data signal corresponding to the position of the tip of the stylus relative to the grid.

14. The digitizing tablet system of claim 13 wherein said stylus is positioned at an angle of tilt relative to said tablet and said processing means also produces a data signal corresponding to the angle of tilt as determined by a law of cosines calculation.

* * * * *